(12) United States Patent
Fang et al.

(10) Patent No.: US 9,389,304 B2
(45) Date of Patent: Jul. 12, 2016

(54) USING MULTIPLE ACCESS CHANNELS FOR WIRELESS DEVICE POSITIONING

(71) Applicants: ZTE Corporation, Shenzhen (CN); ZTE (USA) Inc., Morristown, NJ (US)

(72) Inventors: Yonggang Fang, San Diego, CA (US); YuanFang Yu, Shenzhen (CN); Ting Lu, Beijing (CN); Xiaowu Zhao, Shenzhen (CN)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 532 days.

(21) Appl. No.: 13/899,498

(22) Filed: May 21, 2013

(65) Prior Publication Data

US 2013/0307730 A1 Nov. 21, 2013

(51) Int. Cl.
*G01S 3/02* (2006.01)
*G01S 5/14* (2006.01)
*G01S 5/00* (2006.01)
*H04W 64/00* (2009.01)

(52) U.S. Cl.
CPC .............. *G01S 5/14* (2013.01); *G01S 5/0036* (2013.01); *H04W 64/00* (2013.01)

(58) Field of Classification Search
CPC ........... G01S 3/02; G01S 5/14; G01S 5/0036; H04B 1/00; H04Q 7/20
USPC .................................................. 342/464, 463
See application file for complete search history.

(56) References Cited

U.S. PATENT DOCUMENTS

| | | | | |
|---|---|---|---|---|
| 5,952,969 A * | 9/1999 | Hagerman | ................ | G01S 5/14 342/457 |
| 6,785,321 B1 * | 8/2004 | Yang | .................... | H04B 1/7085 342/357.66 |
| 7,110,774 B1 * | 9/2006 | Davis | .................... | H04W 64/00 342/450 |
| 7,251,267 B2 * | 7/2007 | Panchal | ............... | H04B 1/7117 375/147 |
| 8,135,413 B2 * | 3/2012 | Dupray | .................. | H04W 4/02 455/456.1 |
| 2002/0072378 A1 * | 6/2002 | Gaal | ...................... | G01S 5/0045 455/456.5 |
| 2003/0186710 A1 * | 10/2003 | Muhonen | ................ | H04W 4/02 455/456.5 |
| 2004/0203717 A1 * | 10/2004 | Wingrowicz | ......... | H04W 24/00 455/423 |
| 2005/0075112 A1 * | 4/2005 | Ball | ....................... | H04W 64/00 455/456.1 |
| 2005/0277413 A1 * | 12/2005 | Kim | ...................... | G01S 5/0027 455/435.1 |
| 2006/0267841 A1 * | 11/2006 | Lee | ........................ | G01S 5/0081 342/463 |
| 2010/0273504 A1 * | 10/2010 | Bull | .......................... | G01S 5/02 455/456.1 |
| 2012/0106370 A1 * | 5/2012 | Radulescu | ........ | H04W 36/0083 370/252 |
| 2013/0281076 A1 * | 10/2013 | Damnjanovic | .......... | H04W 8/22 455/418 |
| 2014/0295877 A1 * | 10/2014 | Hart | ........................ | H04W 4/02 455/456.1 |

\* cited by examiner

*Primary Examiner* — Harry Liu
(74) *Attorney, Agent, or Firm* — Perkins Coie LLP (57) ABSTRACT

A wireless device performs a transmission on a primary and auxiliary access channels to enable reception by at least three base stations. The base stations perform a measurement on the received transmission, e.g., a time of arrival of the transmission. The base stations report their measurements to a position determination entity. The position determination entity estimates geographic position of the wireless device. One method used by the position determination entity includes tri-lateralization based on the received measurement reports.

21 Claims, 8 Drawing Sheets

| Frame Length (ms) | Frame Type | Transmission Rate | Number of Bits per Frame ||||
|---|---|---|---|---|---|---|
| | | | Total Bits | Information Bits | Frame Quality Indication | Encoder Tail Bits |
| 20 | Data | 1200 | 24 | 16 | 8 | 0 |
| 20 | Data | 2400 | 48 | 40 | 8 | 0 |
| 20 | Data | 4800 | 96 | 80 | 16 | 0 |
| 20 | Data | 9600 | 192 | 172 | 12 | 8 |
| 20 | Data | 19200 | 384 | 360 | 16 | 8 |
| 20 | Data | 38400 | 768 | 744 | 16 | 8 |

USING MULTIPLE ACCESS CHANNELS FOR WIRELESS DEVICE POSITIONING

CROSS REFERENCE TO RELATED APPLICATIONS

This document claims the right of priority under 35 U.S.C. §119(a) and the Paris Convention of International Patent Application No. PCT/CN2012/075835, filed on May 21, 2012. The entire content of the before-mentioned patent application is incorporated by reference herein.

BACKGROUND

This document relates to wireless device positioning in wireless communication systems.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry data such as voice data and other data content to wireless devices. A base stations can be referred to as an access point (AP), eNodeB or access network (AN) or can be included as part of an access network. Further, a wireless communication system can include one or more network nodes to control one or more base stations.

A wireless device can use one or more different wireless technologies for communication with the network. Various wireless technologies examples include Code division Multiple Access (CDMA) such as CDMA2000 1x, High Rate Packet Data (HRPD), and Long-Term Evolution (LTE), Worldwide Interoperability for Microwave Access (WiMAX). In some implementations, a wireless communication system can include multiple networks using different wireless technologies.

The increasing use of wireless devices for receiving information and entertainment relies on, among other things, knowing physical locations of the wireless devices to provide geographically pertinent information and services. Such information and services are sometimes called "location based services." These, and other applications, increasingly are looking for more accurate and reliable techniques for determining the position of a wireless device.

Better techniques for determining wireless device location are needed.

SUMMARY

The present document discloses techniques for use in a wireless communication network to estimate geographic position of a wireless device.

In one example aspect, a method for wireless communications implemented by a wireless device is disclosed. The method includes receiving, at the wireless device, a position request message from a requester base station, measuring, in response to the received position request message, characteristics of signals received from multiple base stations, including the requester base station, preparing a position report using the signal characteristics, wherein the position report provides information enabling determination of geographic location of the wireless device, and transmitting the position report.

In another example aspect, a disclosed wireless communication apparatus includes a receiver that receives a position request message from a base station, a signal measurer that measures characteristics of signals received from multiple base stations, a report preparer that prepares, in response to the received position request message, a position report using the signal characteristics, and a transmitter that transmits the position report on an access channel.

In yet another example aspect, a method of facilitating determination of position of a mobile station, the method implanted in a wireless network is disclosed. The method includes receiving, at a first base station, an access transmission from a mobile station on a primary access channel, receiving, at a second base station, the access transmission from the mobile station on a first auxiliary access channel, receiving, at a third base station, the access transmission from the mobile station on a second auxiliary access channel, generating, based on the access transmission, a first positioning report at the first base station, generating, based on the access transmission, a second positioning report at the second base station, generating, based on the access transmission, a third positioning report at the third base station, and communicating the first positioning report, the second positioning report and the third positioning report to a position determination entity operating in the wireless communications network for estimating position of the mobile station.

These, and other aspects, are further disclosed below.

BRIEF DESCRIPTION OF THE DRAWINGS

Like reference symbols in the various drawings indicate like elements.

DETAILED DESCRIPTION

The methods, apparatus and systems disclosed in this document can be used in some embodiments to estimate or determine the position (e.g., geographic location) of a wireless device. In some implementations, the location information is obtainable even when the wireless device either has no global positioning system (GPS) signal receiving circuitry or when the wireless device is in a location where the wireless device is not able to receive GPS signals (e.g., indoors).

In wireless communication systems, typically two methods to locate wireless devices' geographic position are used.

A) Device based or Assisted Geo-Positioning

In this method, the wireless device is installed with a geographic positioning capability (hardware or software) measures the radio signaling such as pilots transmitted from different base stations and calculates its own location using base stations' geographic location information, the measured time of arrival (TOA) of pilot signals, Advanced FL Trilateration (AFLT) algorithm, etc.

B) Network Based Geo-Positioning

In the network based geographic positioning, multiple base stations measure the radio signal transmitted from a wireless device, typically at same time, and derive the earliest timing offsets of radial signals from their synchronized timing. Base stations then send the information to a Mobile Switching Center (MSC) or a Positioning Determination Entity (PDE). The MSC/PDE calculates distance of the wireless device to each reporting base station using measured earliest timing offsets of radio signal, and then uses the tri-lateration algorithm to calculate the wireless device's position with base stations' location information and derived distances between wireless device and different base stations.

Various wireless communication systems can use a connection-oriented mode for wireless transmissions. In a typical connection-oriented mode, a wireless device sets up a traffic channel with the wireless network before sending any user data. Once the connection is established, the dedicated radio resource is allocated for a particular traffic channel. The wireless device and wireless network can then use traffic channels to transmit packet data. The radio resource remains occupied until the connection is released even the wireless device or the network does not transmit any data.

The connection-oriented mode transmission has advantages for streaming transmission such as voice, video, data downloading or uploading. For short burst data transmission, such as in various web browsing applications, short messages, instant messaging, e-mails, gaming, machine-to-machine (M2M) communications (e.g., vending machine, monitoring system, smart meter reading, environment sensing), the packet size is typically small and transmission is bursty. Hence, it may not efficient to use connection oriented mode for burst transmission.

The connectionless mode data transmission mechanisms, on the other hand, can provide instant data transmission without establishing a connection and reserving radio resource for the connection. A connectionless mode data transmission mechanisms can provide an efficient way for burst data transmission without the transmission delay incurred in setting up connections in the connection-oriented mode.

The connectionless mode data transmission may include transmitting short burst data over reverse link overhead channels such as reverse link access channel (R-ACH), or reverse link enhanced access channel (R-EACH) in cdma2000 1× technology.

Figure 1:
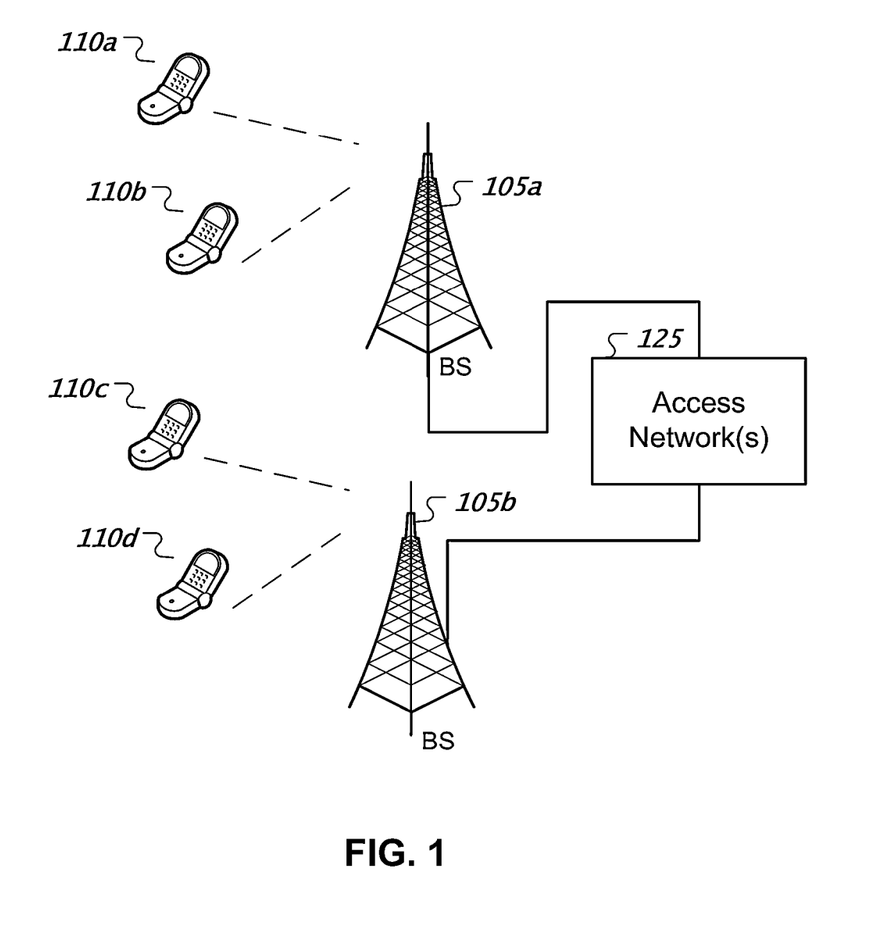
FIG. 1 is a block diagram illustrating a wireless communications network.

FIG. 1 shows an example of a wireless communication system. A wireless communication system can include one or more base stations (BSs) 105a, 105b, one or more wireless devices 110a, 110b, 110c, 110d, and an access network 125. A base station 105a, 105b can provide wireless service to wireless devices 110a, 110b, 110c and 110d in one or more wireless sectors. In some implementations, a base station 105a, 105b includes directional antennas to produce two or more directional beams to provide wireless coverage in different sectors.

The access network 125 can communicate with one or more base stations 105a, 105b. In some implementations, the access network 125 includes one or more base stations 105a, 105b. In some implementations, the access network 125 is in communication with a core network (not shown in FIG. 1) that provides connectivity with other wireless communication systems and wired communication systems. The core network may include one or more service subscription databases to store information related to the subscribed wireless devices 110a, 110b, 110c and 110d. A first base station 105a may provide wireless service based on a first radio access technology, whereas a second base station 105b may provide wireless service based on a first radio access technology and/or a second radio access technology. The base stations 105a and 105b may be co-located or may be separately installed in the field according to the deployment scenario. The access network 125 may support single radio access technology or multiple different radio access technologies.

Various examples of wireless communication systems and access networks that can implement the present techniques include, among others, wireless communication systems based Code division Multiple Access (CDMA) such as cdma2000 1×, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), and Worldwide Interoperability for Microwave Access (WiMAX).

Figure 2:
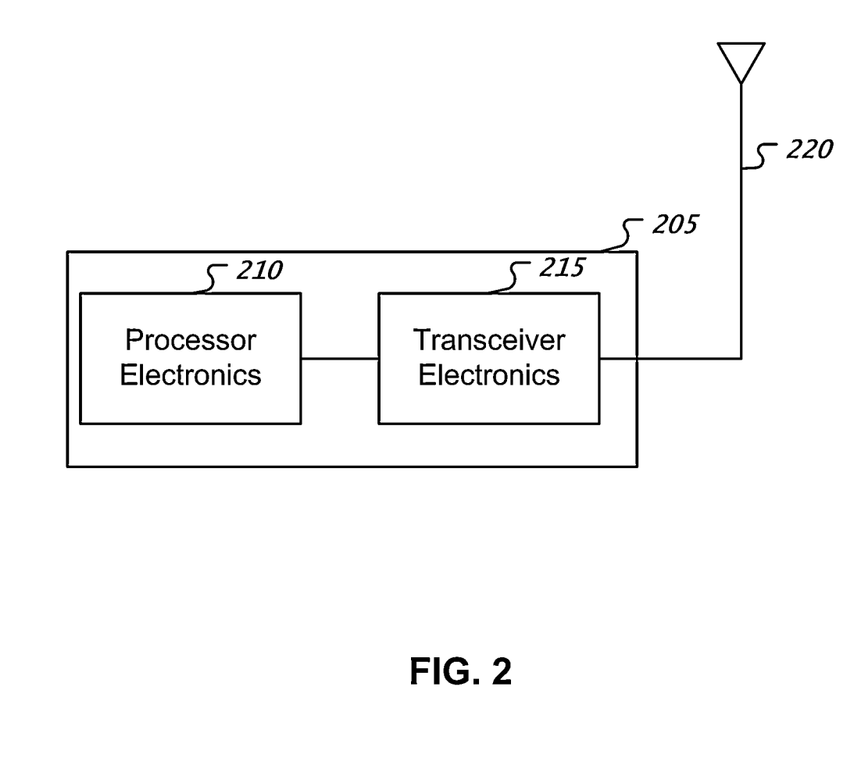
FIG. 2 is a block diagram representation of a wireless communications device.

FIG. 2 shows a radio station 205 such as a base station or a wireless device (e.g., user equipment UE, or mobile station) that can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215. It will be appreciated that the disclosed techniques may be implemented to execute on the radio station 205.

In wireless communication system, in many countries around the world, locating a wireless device's geographic position is a mandatory requirement by the regulation for emergency calls. For M2M wireless devices, however, it may not be mandatory by the regulation, but highly recommended and required by many M2M services and applications such as health care monitoring, environment sensing.

In prior art technologies of geographic positioning, it typically uses two methods of locating the wireless device's geographic position in addition to GPS:

A) Wireless Device Based or Assisted Geo-Positioning

In this method, the wireless device measures the radio signal such as pilots transmitted from different base stations. Based on the measurement result, the wireless device calculate its location using the base stations' geographic location information broadcast from base stations, the measured time of arrival (TOA) of received pilot signals, and Advanced Forward Link (FL) Tri-lateration (AFLT) algorithm.

B) Network Based Geo-Positioning

The second geographic positioning method uses an opposite approach comparing to the wireless device based geographic positioning. In the network based geographic positioning, base stations measure the radio signal transmitted from the wireless device and derive the one-way delay of the radio signals. The base stations then send measurement information to the Mobile Switching Center (MSC) or Position Determination Entity (PDE) in the Core network. The MSC/PDE calculates the distance of wireless device to each reporting base station according to the one-way delay first, and then use tri-literation algorithm to calculate the wireless device's position with geographic information of reporting base stations, and distances of the wireless device to reporting base stations.

Both wireless device based or network based geographic positioning methods have pros and cons.

For the wireless device based geographic positioning method, the following operational limitations may exist:

1) This geographic positioning method requires a wireless device to detect at least three base stations' signals so that the positioning algorithm in the wireless device can be able to calculate the position information of the wireless device. In some case such as in the central of cell, the wireless device may be able to detect only one pilot because pilot signals from adjacent cells are suppressed by the strong pilot signal of the cell that the wireless device attaches to. Therefore the accuracy of the mobile based on geographic positioning may be limited.

High Detectable Pilot (HDP) is an Advanced Forward Link Tri-lateration (AFLT) based technology. In order to solve the issue of traditional wireless device based geographic positioning method, HDP method requires only a few base stations in surrounding area to transmit radio signal (pilot) at certain time called HDP slots while other base stations are muted (i.e. disabling their transmission) at HDP slots. In this way, it significantly reduces the interference during the HDP slots so that the wireless device can be able to measure the radio signal even it is located in the central of a cell. In order for wireless devices to have a chance to detect more HDP pilots, HDP algorithm designates that base stations in the surrounding area alternate transmitting HDP pilot signals in HDP slots.

However, this method has some drawback on the network side. Since it requires base stations to mute their transmission at HDP slots periodically, it has impact on the network capacity. On the wireless device side, the HDP method introduces some delay in measuring and reporting the wireless device's geographic position since HDP capable wireless devices can only measure HDP signals at HDP slots, which is typically designated infrequently. In addition, HDP method may also impact the timing synchronization due to missing pilots for the period of transmissions being muted. The wireless device based geographic positioning fully depends on the wireless device's implementation. Therefore the network may not be easy to control it.

For the network based geographic positioning method, a prior art mechanism is to have base stations to measure the radio signals transmitted by the wireless device over traffic channel transmission. In many cases, since traffic transmit power in CDMA technology is controlled precisely to reduce interference, therefore maybe only one or two base stations can receive the signals transmitted by the wireless device over reverse link.

If the wireless device does not set up a traffic channel, like in M2M cases that the wireless device uses connectionless channel (i.e. reserve link access channel or enhanced access channel), the base station cannot locate the wireless device using prior art positioning mechanism.

In addition, a base station cannot use the existing algorithm to measure geographic position of the wireless device over access channel transmission. This is because a base station only allocates one access channel per base station and can only monitor the access probe over its access channel. Adjacent base stations cannot detect an access probe sent by the wireless device over other access channels, because adjacent base stations typically allocate their corresponding access channels using different transmission resources (different frequencies or time slots). Therefore it is not possible for multiple base stations to detect an access probe at same time and measure its time of arrival of the radio signal.

The techniques disclosed in the present document, in one aspect, can be used to facilitate the location of a wireless device over multiple access channels set up and received by different base stations.

The presently disclosed multiple access channels positioning has many advantages in comparison to the wireless device based geographic positioning or traditional network based geographic positioning, some of which are enumerated below.

1) The multiple access channels positioning is a generic solution applicable to any access probe over access channel or enhanced access channel. It can be used to locate either legacy wireless devices or new M2M devices whenever they transmit the access probe over the reverse link access channel or enhanced access channel.

2) Lower rate transmission over enhanced access channel could help base stations to detect a wireless device's transmission and locate its position.

3) The multiple access channels positioning has no adverse impact on the cdma2000 network capacity.

4) The network can instantly locate a wireless device's position when the wireless device transmits.

5) In some embodiments, the multiple access channel positioning can be fully controlled by the network.

Figure 3:
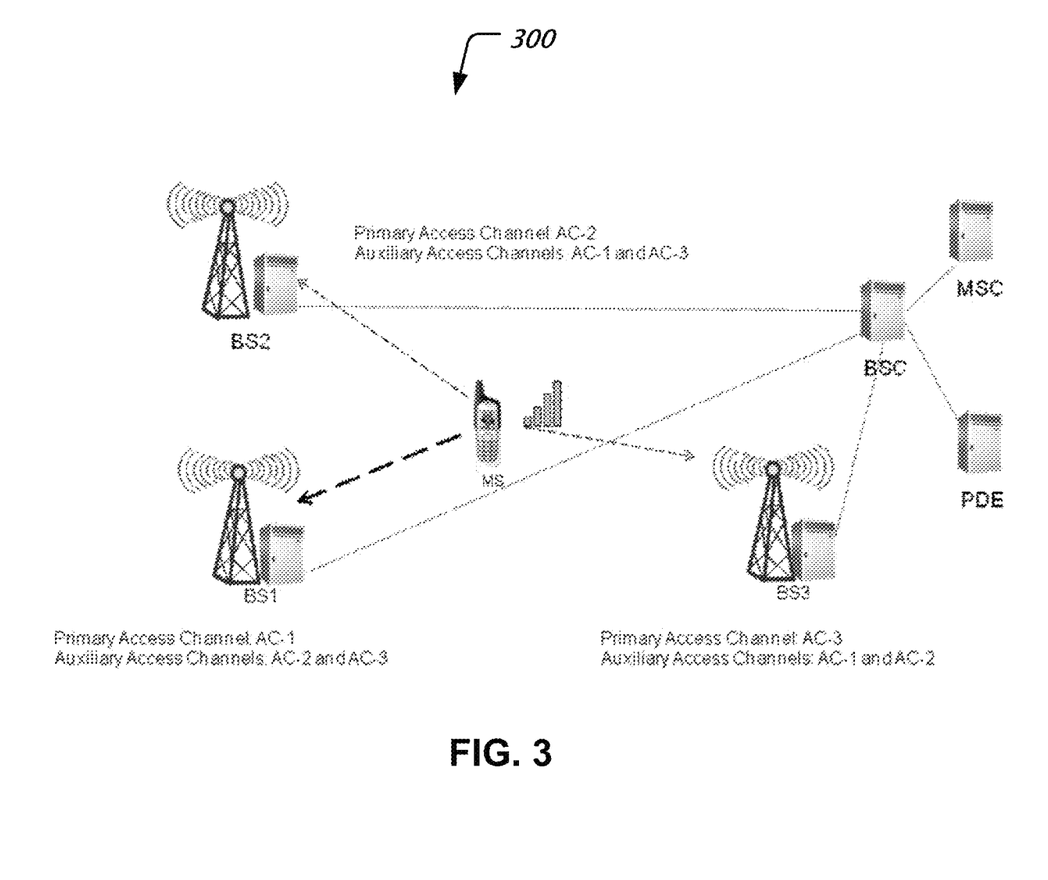
FIG. 3 shows an example of using multiple access channels to locate wireless device's geographic position.

FIG. 3 shows an example network architecture 300 suitable for using multiple access channels in different base stations to locate wireless devices' geographic position.

Primary Access Channel: the primary access channel is the existing access channel or enhanced access channel which is configured using its own access long code mask of the sector.

Auxiliary Access Channel: an auxiliary access channel of a sector is the access channel configured on one or more adjacent sectors or base stations using the primary access long code mask of the sector.

In FIG. 3, the base station BS1 is configured with one Primary Access Channel (AC-1) and two Auxiliary Access Channels (AC-2 and AC-3) corresponding to base stations BS2 and BS3. AC-1 is provisioned using the access long code mask of BS1, and AC-2 and AC-3 are provisioned using access long code masks of BS2 and BS3 respectively. Similarly the auxiliary access channels can be configured in base stations BS2 and BS3. With such auxiliary access channels configuration on other adjacent base stations, multiple base stations could be able to detect an access probe transmitted from a wireless device simultaneously. For example, the wireless device (depicted as mobile station MS in FIG. 3, also similar to devices 110a to 110d in FIG. 1) is attaching to BS1 and transmits an access probe over AC-1. The base stations BS2 and BS3 may detect the access probe transmitted from the wireless device in the auxiliary access channel AC-1 on BS2 and BS3.

Access channel geographic positioning mechanism is a network based geographic positioning algorithm through the measurement of radio signal transmitted by the wireless device over the access channel on multiple adjacent base stations. Since the primary access channel and its auxiliary access channels use the same access long code mask, the multiple base stations that are configured with access channel or auxiliary access channels can acquire the same access probe transmitted from a wireless device and measure its time of arrival at each base station. Thereafter, base stations may send this measured information to MSC/PDE for locating the wireless device's geographic position.

In a cdma2000 system, a wireless device uses the open loop power control mechanism to determine the initial transmit power setting over access channel or auxiliary access channels. It is possible for multiple adjacent base stations to detect an access probe at same time. Furthermore, the link budget on the reverse link may be a few dB higher than the forward link of cdma2000 1× system, which increases hearability of using multiple access channels to locate the geographic position of a wireless device.

The access channel geographic positioning mechanism can be used on any messages or signals that wireless device transmits over the reverse access channel (R-ACH) or reverse enhanced access channel (R-EACH). Once the wireless device transmits an access probe over R-ACH or R-EACH, multiple base stations can detect the transmission, derive the time of arrival (TOA) of the access signal and report measured TOA information to MSC/PDE. The MSC/PDE then calculates the position of wireless device according to time of arrivals reported from multiple base stations.

The access channel's hearability depends on signal coherency. For a stationary device, the coherency time could be much longer than a mobile device. The access channel's hearability also depends on the access channel transmission rate. Reducing the transmission rate of access channel may help base stations to be able to detect an access probe transmitted from the wireless device. For example, reduced rate transmissions may be successfully received by multiple base stations farther away from the transmitting device, which would not have otherwise been successfully received by these base stations.

In order to improve hearability of access channel (i.e., probability that the receiving devices are able to receive and decode access channel transmissions), a lower data rate such as 1.2 kbps, 2.4 kbps or 4.8 kbps could be used for R-EACH. Comparing to existing transmit data rate of R-EACH (9.6 kbps), the transmission with 4.8 kbps, 2.4 kbps or 1.2 kbps can further improve the reverse link budget by 3 dB, 6 dB and 9 dB respectively.

Figure 4:
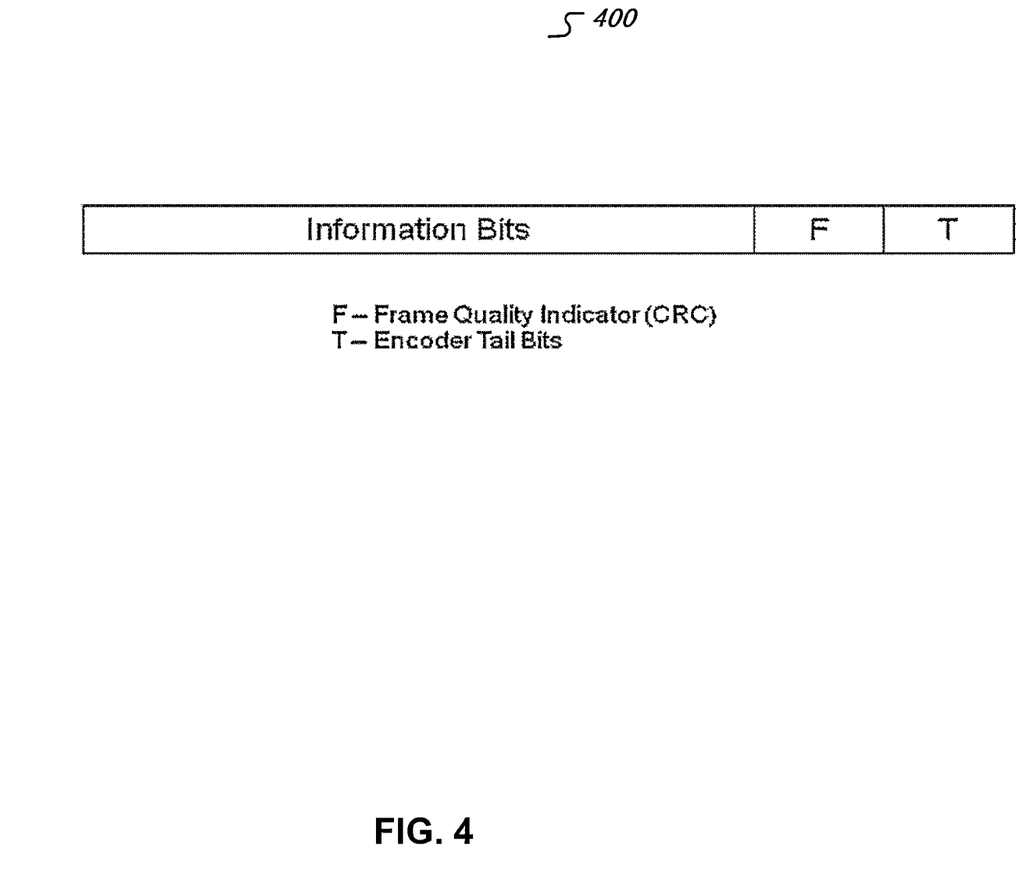
FIG. 4 shows an example of access channel data format.

FIG. 4 shows an example of access channel data format. The information bits field carry the payload of access message sent from the wireless device. F field is the frame quality indicator (CRC) used by the base station to detect the transmission error. T field is the encoding tail bits.

Figure 5:
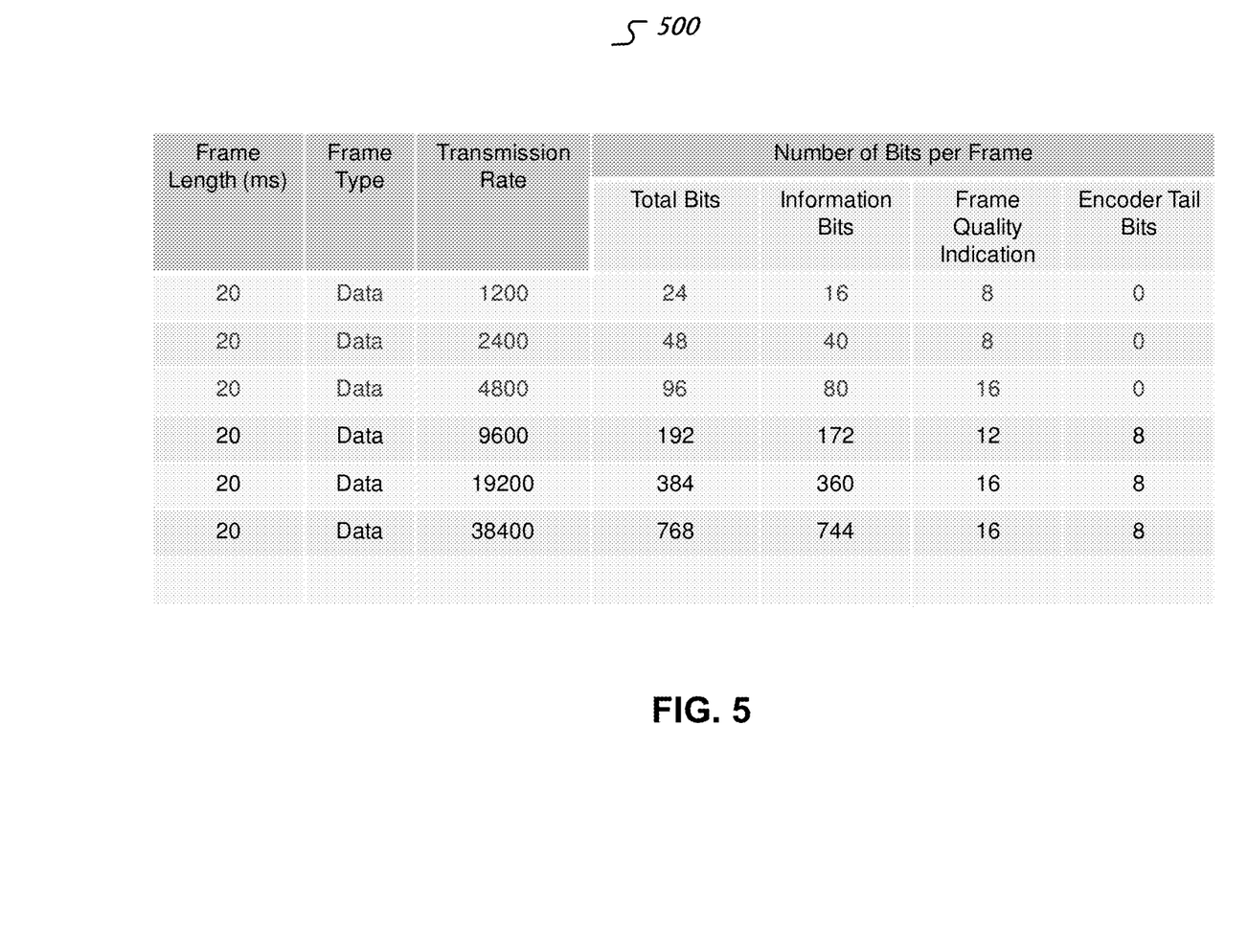
FIG. 5 shows an example of new data rates of 1.2 kbps, 2.4 kbps and 4.8 kbps for R-EACH.

FIG. 5 shows a table 500 in which various examples of the possible data rates of 1.2 kbps, 2.4 kbps and 4.8 kbps for the R-EACH are listed.

Figure 6:
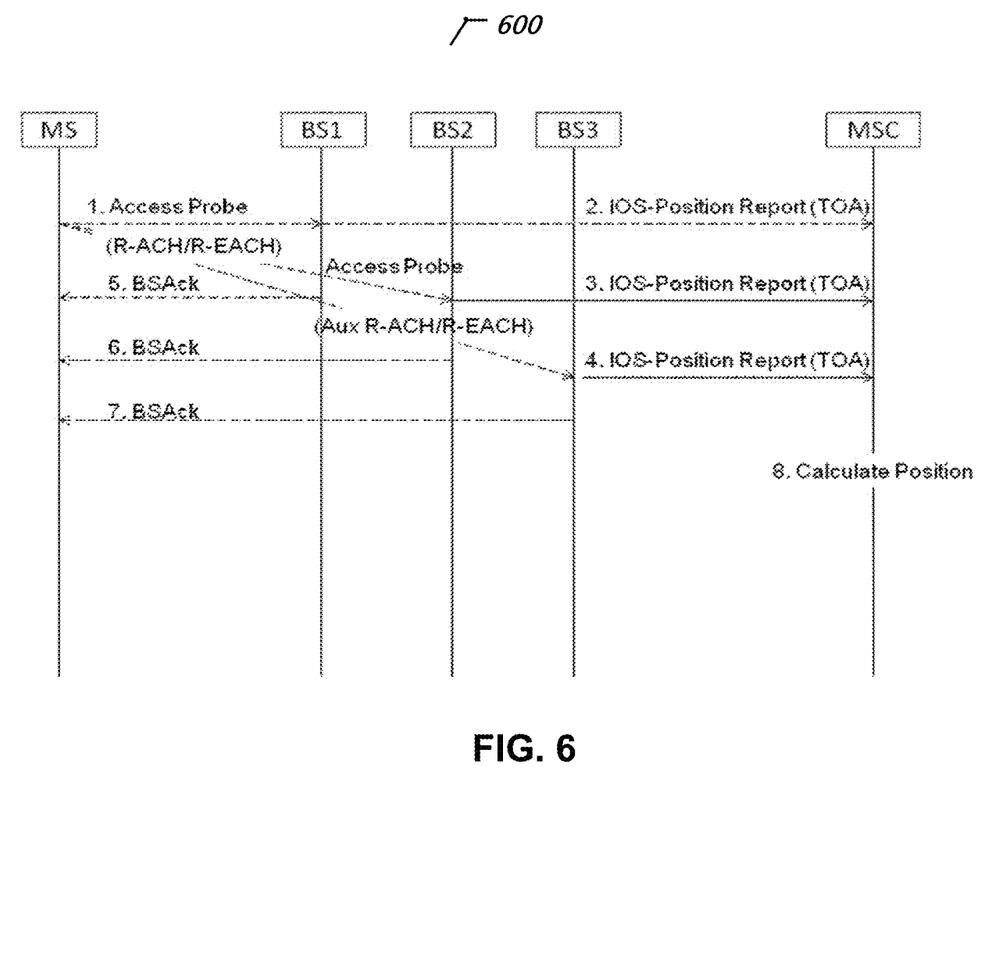
FIG. 6 shows an example of procedure for applying multi-access channel positioning mechanism to an access probe of wireless device.

FIG. 6 shows an example of multiple base stations using access channels to locate mobile station's position when it transmits an access probe.

1) A wireless device MS attaches to the base station BS1 and send an access probe to BS1.

2) BS1 acquires the access probe and gets its TOA information from the access signal. BS1 then sends IOS-Positioning Report Message (IOS-PRTM) with its measured TOA information to MSC/PDE.

3) Due to auxiliary access channels being configured in multiple base stations, the base station BS2 may receive the access probe. BS2 sends an IOS-PRTM with its measured TOA information to MSC/PDE.

4) Similarly the base station BS3 may receive the access probe and sends an IOS-PRTM with its measured TOA information to MSC/PDE.

5) After receiving the access probe from the wireless device, BS1 sends a BSAck order message to the wireless device MS.

6) BS2 sends a BSAck order message to the wireless device MS.

7) BS3 sends a BSAck order message to the wireless device MS.

8) MSC/PDE calculates MS's position based on received TOA information.

Figure 7:
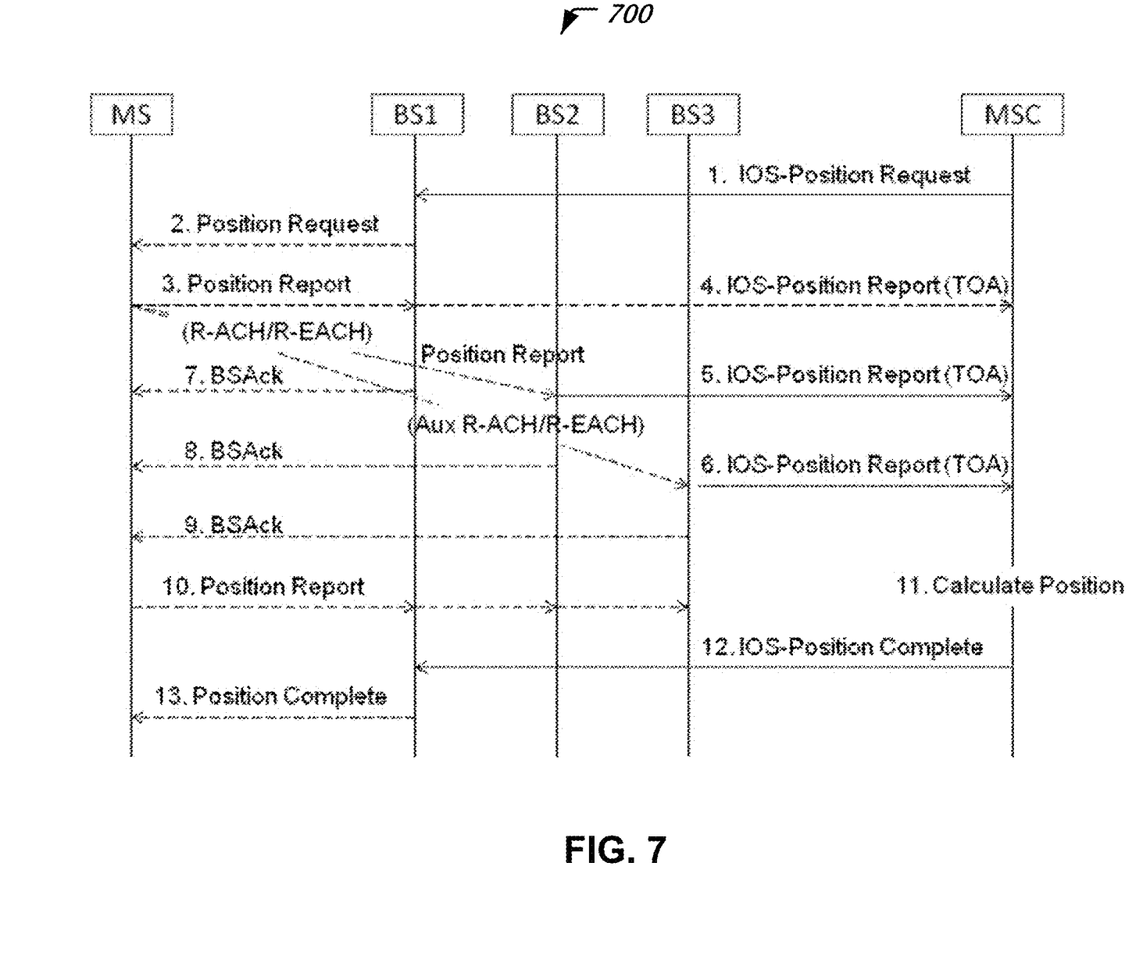
FIG. 7 shows an example of network initiated multi-access channel positioning procedure.

FIG. 7 illustrates an example of the network initiated access channel positioning procedure.

1) The wireless device is attached to (i.e., is in coverage of) the base station BS1. The MSC/PDE sends an IOS-Positioning Request Message (IOS-PRM) to BS1.

2) BS1 sends a Position Request Message (PRM) to the wireless device MS over the paging channel.

3) After receiving the PRM, the wireless device MS sends a Positioning Report Message (PRTM) over the access channel (R-ACH) or enhanced access channel (R-EACH) using the lowest data rate through the base station BS1.

4) BS1 may receive the PRTM over the R-ACH or R-EACH. BS1 detects TOA (or one-way delay) of access probe and send an IOS-Positioning Report Message (IOS-PRTM) with its measured TOA (or one-way delay) information to MSC/PDE.

5) Due to auxiliary access channels being configured over multiple base stations, BS2 may receive the PRTM and detect TOA (or one-way delay) of access probe. BS2 sends an IOS-PRTM with its measured TOA (or one-way delay) information to MSC/PDE.

6) Similarly, BS3 may receive the PRTM and detect TOA (or one-way delay) of the access probe. BS3 sends an IOS-PRTM with its measured TOA (or one-way delay) information to MSC/PDE.

7) BS1 sends a BSAck order message to the wireless device MS after receiving PRTM. MS may ignore this BSAck.

8) BS2 send a BSAck order message to the wireless device MS after receiving PRTM. MS may ignore this BSAck.

9) BS3 sends a BSAck order message to the wireless device MS after receiving PRTM. MS may ignore this BSAck.

10) MS may continue sending a PRTM if it does not receive a Positioning Complete Message (PCM).

11) MSC/PDE calculates MS's position based on received TOA (or one-way delay) information.

12) MSC/PDE sends an IOS-Positioning Complete message (IOS-PCM) to BS1.

13) BS1 then sends a Positioning Complete Message (PCM) to the MS. MS stops the Positioning Report Message (PRTM) transmission.

In another embodiment, a wireless station may be configured to transmit multiple (e.g., three) different position location requests to multiple (e.g., three) base stations over the access channels of the individual base stations. The wireless station may be informed of the access channels using, e.g., a neighbouring list communicated by its home base station, or other well-known techniques. The wireless station may transmit the position location requests as close to each other in time as possible (e.g., every next available opportunity on each access channel). In the case of M2M communication or slow-moving wireless stations, the position may not change significantly between the access channel transmissions, thereby minimizing any ambiguities in position due to the movement of the wireless station. When a base station receives the position location request, the base station may perform the above-discussed communication with the MSC/PDE to obtain position information.

Figure 8:
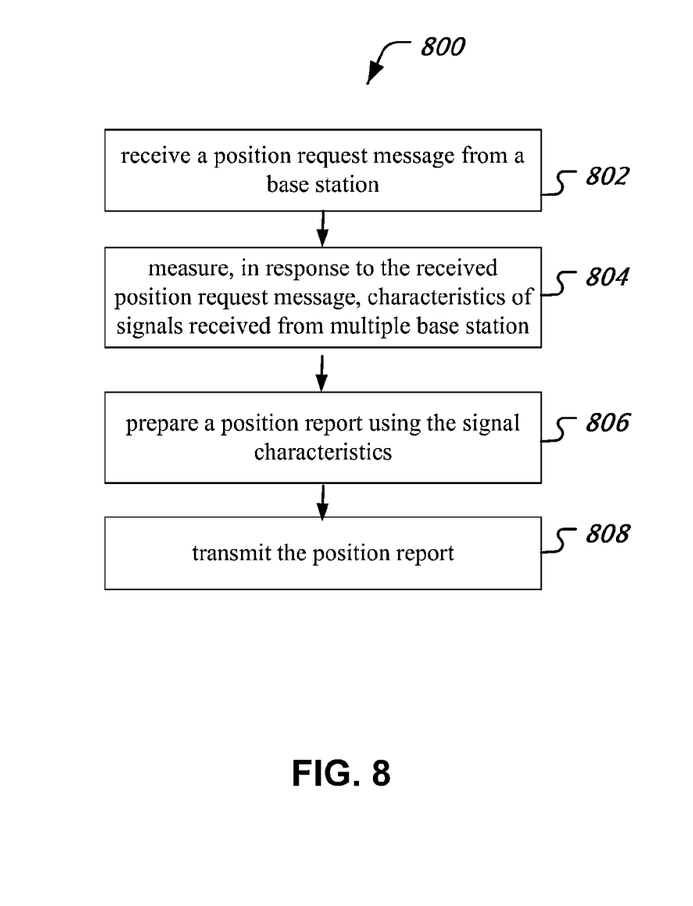
FIG. 8 is a flow chart representation of a process of wireless communications.

FIG. 8 is a flow chart representation of a process 800 of wireless communications. The process 800 may be implemented at a wireless device. At 802, a position request message is received from a base station. At 804, in response to the received position request message, characteristics of signals received from multiple base stations are measured. The characteristics may include, for example, transmission time of arrival, ranging information, power, etc. At 806, using the measured signal characteristics, a position report is prepared. At 808, the position report is transmitted to the requester of the position information.

Figure 9:
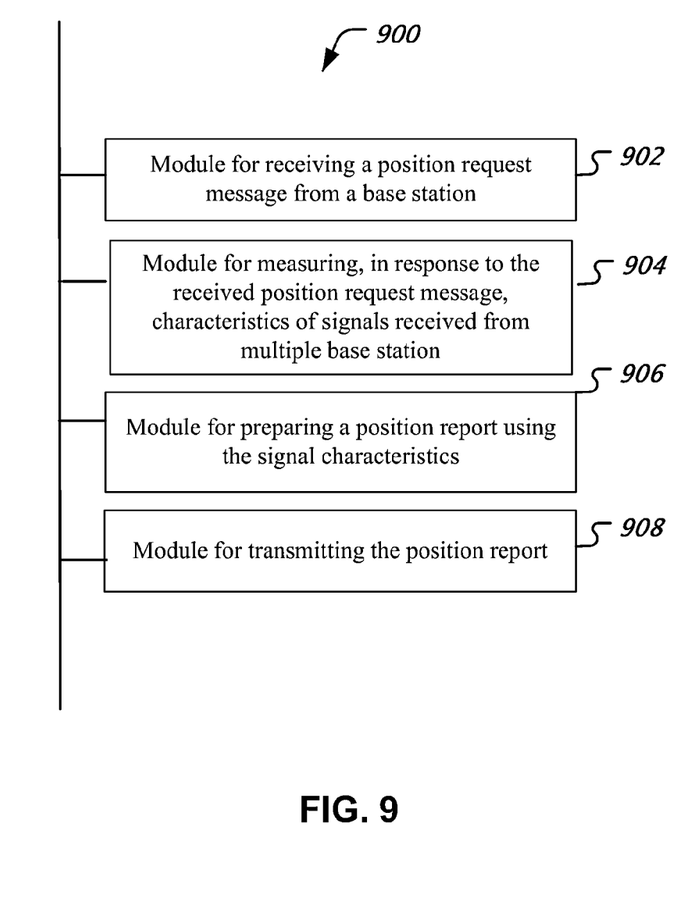
FIG. 9 is a block diagram representation of a portion of a wireless communications apparatus.

FIG. 9 is a block diagram representation of a portion of a wireless communications apparatus 900. The module 902 is for receiving a position request message from a base station. The module 904 is for measuring, in response to the received position request message, characteristics of signals received from multiple base stations. The module 906 is for preparing a position report using the measured signal characteristics. The module 908 is for transmitting the position report.

Some embodiments use a computer program product comprising a non-transitory, computer-readable medium having code stored thereon. The code, when executed by a processor, causes the processor to implement a method, e.g., as disclosed with respect to FIG. 8.

Some embodiments include a wireless communications apparatus comprising means for receiving a position request message from a base station, means for measuring, in response to the received position request message, characteristics of signals received from multiple base station, means for preparing a position report using the signal characteristics and means for transmitting the position report.

Some embodiments include a position determination method performed at a position determination entity operable in a wireless communications network. A position determination request for a wireless device is transmitted to a home base station serving the wireless device. In response to the request, a plurality of position reports are received from a plurality of base stations. A position of the wireless device is calculated based on the plurality of position reports.

In some embodiments, a wireless communications system includes at least one mobile station configured to transmit a position signal over an access channel, a first base station configured to operate with the access channel as its primary access channel, thereby receiving the position signal and a plurality of base stations configured to operate with the access channel as an auxiliary access channel, thereby receiving the position signal, the plurality of base stations having corresponding different primary access channels. The first base station and the plurality of base stations are further configured to communicate a position report to a position determination entity in the wireless communication system, based on the received position signal from the at least one mobile station.

The disclosed and other embodiments, modules and the functional operations described in this document (e.g., a receiver, a signal measurer, a report preparer, a transmitter, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications implemented by a wireless device, comprising:
   receiving, at the wireless device, a position request message from a requester base station;
   measuring, at the wireless device, in response to the received position request message, characteristics of signals received from at least two base stations, including at least the requester base station, wherein the characteristics comprise at least one of transmission time of arrival, ranging information, or power;
   preparing a position report, at the wireless device, using the signal characteristics, wherein the position report provides information enabling determination of geographic location of the wireless device; and
   transmitting, at the wireless device to the requester base station, the position report on an access channel, wherein the transmitter continues transmissions of the position report until a positioning complete message is received by the wireless communication device.

2. The method of claim 1, wherein the access channel is an enhanced access channel.

3. The method of claim 1, wherein the position report is transmitted at 1.2 kbps, 2.4 kbps or 4.8 kbps.

4. The method of claim 1, wherein the position report includes a time of arrival information.

5. The method of claim 1, wherein the wireless device is configured to operate in a code division multiple access (CDMA) network.

6. The method of claim 1, wherein the wireless device is configured to operate in a long-term evolution (LTE) network.

7. A wireless communications apparatus, comprising:
   a receiver that receives a position request message from a base station;
   a signal measurer that measures characteristics of signals received from at least two base stations;
   a report preparer that prepares, in response to the received position request message, a position report using the signal characteristics; and
   a transmitter that transmits the position report on an access channel, wherein the transmitter continues transmissions of the position report until a positioning complete message is received by the wireless communication apparatus.

8. The apparatus of claim 7, wherein the transmitting the position report comprises transmitting the position report at 1.2 kbps, 2.4 kbps or 4.8 kbps.

9. The apparatus of claim 7, wherein the position report includes a received signal power information.

10. The apparatus of claim 7, wherein the wireless communications apparatus is configured to operate in a long term evolution (LTE) network.

11. The apparatus of claim 7, wherein the wireless communications apparatus is configured to operate in a code division multiple access (CDMA) network.

12. A method of facilitating determination of position of a mobile station, the method implanted in a wireless network, comprising:
   receiving, at a first base station, an access transmission from a mobile station on a primary access channel, the primary access channel being configured using its own long code mask;
   receiving, at a second base station, the access transmission from the mobile station on a first auxiliary access channel, the first auxiliary channel being configured using the long code mask of an adjacent sector;
   receiving, at a third base station, the access transmission from the mobile station on a second auxiliary access channel, the second auxiliary channel being configured using the long code mask of an adjacent sector;
   generating, based on the access transmission, a first positioning report at the first base station;
   generating, based on the access transmission, a second positioning report at the second base station;
   generating, based on the access transmission, a third positioning report at the third base station; and
   transmitting the first positioning report, the second positioning report and the third positioning report to a position determination entity operating in the wireless communications network for estimating position of the mobile station.

13. The method of claim 12, wherein the first positioning report, the second positioning report and the third positioning report are generated based on a time of arrival of the access transmission at respective base stations.

14. The method of claim 12, wherein the position of the mobile station is estimated using a tri-lateration algorithm.

15. The method of claim 12, wherein the base station is configured to operate in a code division multiple access (CDMA) network.

16. The method of claim 12, wherein the wireless network is a long term evolution (LTE) network.

17. A system for facilitating determination of position of a mobile station, comprising:
   a first base station that receives an access transmission from a mobile station on a primary access channel, the primary access channel being configured using its own long code mask;
   a second base station that receives the access transmission from the mobile station on a first auxiliary access channel, the first auxiliary channel being configured using the long code mask of an adjacent sector;
   a third base station that receives the access transmission from the mobile station on a second auxiliary access channel, the second auxiliary channel being configured using the long code mask of an adjacent sector; and
   a position determination entity that determines the position of the mobile station;
   wherein the first base station generates, based on the access transmission, a first positioning report and transmits the first positioning report to the position determination entity;
   wherein the second base station generates, based on the access transmission, a second positioning report and transmits the second positioning report to the position determination entity; and
   wherein the third base station generates, based on the access transmission, a third positioning report and transmits the third positioning report to the position determination entity.

18. The system of claim 17, wherein the first positioning report, the second positioning report and the third positioning report are generated based on a time of arrival of the access transmission at respective base stations.

19. The system of claim 17, wherein the position determination entity determines the position of the mobile station using a tri-lateration algorithm.

20. The method of claim 17, wherein the wireless network is a code division multiple access (CDMA) network.

21. The system of claim 17, wherein the first base station, second base station, and third base station are configured to operate in a long term evolution (LTE) network.

* * * * *